(12) United States Patent
Dahlheimer (10) Patent No.: US 9,120,099 B2
(45) Date of Patent: Sep. 1, 2015

(54) SHREDDER FOR PRODUCING PARTICLES FROM A SHEET MATERIAL

(71) Applicant: AUTOMATIK PLASTICS MACHINERY GMBH, Grossostheim (DE)

(72) Inventor: Stefan Dahlheimer, Kleinostheim (DE)

(73) Assignee: AUTOMATIK PLASTICS MACHINERY GMBH, Grossostheim (DE)

( * ) Notice: Subject to any disclaimer, the term of this patent is extended or adjusted under 35 U.S.C. 154(b) by 148 days.

(21) Appl. No.: 14/088,663

(22) Filed: Nov. 25, 2013

(65) Prior Publication Data

US 2014/0077013 A1    Mar. 20, 2014

Related U.S. Application Data

(63) Continuation of application No. 12/952,064, filed on Nov. 22, 2010, now Pat. No. 8,616,480.

(30) Foreign Application Priority Data

May 27, 2008  (DE) .......................... 10 2008 025 250
May 25, 2009  (WO) ................. PCT/EP2009/003687

(51) Int. Cl.
| | |
|---|---|
| *B02C 18/14* | (2006.01) |
| *B02C 18/18* | (2006.01) |
| *B26D 1/24* | (2006.01) |
| B02C 18/22 | (2006.01) |
| B26D 1/38 | (2006.01) |

(52) U.S. Cl.
CPC ............. *B02C 18/142* (2013.01); *B02C 18/148* (2013.01); *B02C 18/182* (2013.01); *B26D 1/245* (2013.01); *B02C 2018/2208* (2013.01); *B26D 1/385* (2013.01)

(58) Field of Classification Search
CPC .............................. B02C 18/142; B02C 18/14
USPC ................................ 241/152.2, 236, 295, 294
See application file for complete search history.

(56) References Cited

U.S. PATENT DOCUMENTS 3,986,845 A    10/1976   Hotchkiss

FOREIGN PATENT DOCUMENTS

| | | |
|---|---|---|
| DE | 2164566 A1 | 6/1973 |
| DE | 3013617 A1 | 10/1980 |
| DE | 8813569 U1 | 1/1989 |
| DE | 4432173 A1 | 4/1995 |
| DE | 4427347 A1 | 2/1996 |
| DE | 19640845 A1 | 4/1998 |
| JP | 50-043584 A | 4/1975 |
| JP | H09-323287 A | 12/1997 |
| JP | H10-244487 A | 9/1998 |
| JP | 2002-096289 A | 4/2002 |

*Primary Examiner* — Mark Rosenbaum
(74) *Attorney, Agent, or Firm* — Buskop Law Group, PC; Wendy Buskop (57) ABSTRACT

A shredder for producing particles from a sheet material is disclosed herein. The shredder can have a longitudinal cutting device with a first cutting roller and a second cutting roller. A transverse cutting device can be positioned after the longitudinal cutting device. The first cutting roller and the second cutting roller can each have special profiles.

9 Claims, 7 Drawing Sheets

SHREDDER FOR PRODUCING PARTICLES FROM A SHEET MATERIAL

CROSS REFERENCE TO RELATED APPLICATIONS

The present patent application is a Continuation of co-pending U.S. patent application Ser. No. 12/952,064 filed on Nov. 22, 2010, entitled "SHREDDER FOR PRODUCING PARTICLES FROM A SHEET MATERIAL," which claims priority to and the benefit of International Patent Application No. PCT/EP2009/003687 filed May 25, 2009, entitled "SHREDDER FOR PRODUCING PARTICLES FROM A SHEET MATERIAL," which claims priority to DE Application No. 102008025250.6, which was filed May 27, 2008. These references are incorporated in their entirety herein.

FIELD

The present embodiments generally relate to a shredder for producing particles from a sheet material.

BACKGROUND

A need exists for a shredder for producing particles, including particles of a regularly shaped pellet form, from a sheet material. The shredder can serve as an alternative to the crushing such materials, which can lead to less regularly shaped pellet forms.

A need exists for a shredder for producing particles from a sheet material that overcomes the disadvantages of the prior art and offers safe and reliable shredding/pelletization for a wide range of different materials, including plastic materials that have not completely solidified.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a shredder.

The shredder, which can also be referred to as a sheet pelletizer, can be used to produce particles or pellets from a sheet material. The sheet material can be an extruded plastic material or a plastic material extruded or delivered from an autoclave with corresponding plastic melt. In one or more embodiments, a cellulose or elastomer material can be used.

The shredder can have a longitudinal cutting device with a first cutting roller and a second cutting roller. The longitudinal cutting device can shred the sheet material into strips. The strips can run in a longitudinal direction of the sheet material.

The shredder can also have a transverse cutting device. The traverse cutting device can be positioned after the longitudinal cutting device. The longitudinal cutting device can supply individual particles or pellets formed from the strips of the sheet material to the transverse cutting device in a direction parallel to the travel direction of the sheet material. Any plastic melt material can be shredded or pelletized into particles or pellets using the shredder.

In one or more embodiments, the first cutting roller can have a saw-tooth profile with longitudinal faces. The longitudinal faces can be inclined to the direction of the longitudinal axis of the first cutting roller. The saw-tooth profile can also have abutting faces located thereon. The abutting faces can extend at least section-wise perpendicularly to the longitudinal axis of the first cutting roller. As such, the first cutting roller can be provided in its longitudinal direction with section-wise arranged face profiles. The face profiles can be circularly arranged around the circumference of the first cutting roller. The face profiles can be face profiles other than conventional helix or thread profiles, which continue circularly along the longitudinal axis of the first cutting roller.

In one or more embodiments, the second cutting roller can have a saw-tooth profile with a second set of longitudinal faces. The second set of longitudinal faces can be inclined to the direction of the longitudinal axis of the second cutting roller. The saw-tooth profile can have second abutting faces located thereon. The second abutting faces can extend at least section-wise perpendicularly or being at least section-wise inclined up to four degrees to the perpendicular of the longitudinal axis of the second cutting roller. Accordingly, the second cutting roller can have second face profiles arranged section-wise in the longitudinal direction of the second cutting roller. The second face profiles can be circularly arranged around the circumference of the second cutting roller. The second face profiles can be face profiles other than conventional helix or thread profile, which continue circularly along the longitudinal axis of the second cutting roller.

The first cutting roller and the second cutting roller can be arranged in pairs.

The saw-tooth profile of the first cutting roller can engage with the saw-tooth profile of the second cutting roller to a penetration depth (T). The penetration depth (T) can be adjustable in the longitudinal/axial direction of the cutting rollers.

At least one of the first longitudinal faces of the saw-tooth profile of the first cutting roller can abut section-wise on a face of the saw-tooth profile of the second cutting roller. As such, the resultant cutting edges of the formed longitudinal cutting device can extend parallel in the longitudinal direction of the sheet material. As such, at least three of four sides of the respective cut strips of the sheet material can be in contact between the respective longitudinal faces of the saw-tooth profiles of the first cutting roller, the second cutting roller, and the respective faces of the saw-tooth profile of the second cutting roller. The sheets can be in full contact with at least two or more sections/sides as necessary, depending on whether the material is formable or not formable. The sheets can be guided at an angle to the respective longitudinal axes of the first cutting roller and the second cutting roller according to the inclinations of the respective longitudinal faces of the first cutting roller and the second cutting roller, and the sheets can be guided parallel in the longitudinal direction of the sheet material according to the resultant cutting edges.

After the longitudinal cutting device, the respective strips can be supplied parallel in the longitudinal direction of the sheet material continuously to the transverse cutting device. The intermeshing profiles of the first cutting roller and the second cutting roller can be designed to provide a section-wise guiding of the respective strips of the sheet material parallel to the longitudinal direction/in-feed and removal direction of the sheet material to and from the longitudinal cutting device. In at least the region of the longitudinal cutting device, the respective cut strips of the sheet material can be inclined to the longitudinal axes of the first cutting roller and the second cutting roller of the longitudinal cutting device and can be so guided.

The relatively simple design of the shredder can permit the secure parallel guiding of the sheet material and of the cut longitudinal strips of the sheet material in the longitudinal direction and/or travel direction of the sheet material. The relatively simple design of the shredder can permit the simple and reliable separability of the cut strips of the sheet material from the respective regions of the cutting rollers. As such, where use is made of sheet plastic melt material that has been extruded from a plastic melt, the shredder can reliably ensure that there is no clumping in the region of the longitudinal cutting device. At the same time, a reliable parallel in-feed to the transverse cutting device can be maintained. Furthermore, the arrangement of the faces and of the resultant spatial position(s) of the cutting edge(s) allow an advantageous re-sharpening effect of the cutting edges of the longitudinal cutting device. The re-sharpening effect can occur automatically during operation of the device, because, during operation the respective faces can execute corresponding motions relative to one another. And there can be no change/no intended change in their relative positions with respect to one another.

The section-wise saw-tooth profile affords a high degree of ease of maintenance, because a simple re-sharpening of the profile with simple retention of the geometry is possible.

In one or more embodiments, a high-low profile with alternating right/left saw-tooth profiles can be used. Such a high-low profile can be provided section-wise in a minor-inverted manner, with the alternating right/left saw-tooth profiles being in each case minor-inverted.

In such a shredder, with a high-low profile, the first cutting roller of the longitudinal cutting device can have a high-low profile with longitudinal faces. The longitudinal faces can be inclined to the direction of the longitudinal axis of the first cutting roller. The high-low profile can also have abutting faces thereon. The abutting faces can extend at least section-wise perpendicularly or be at least section-wise inclined up to four degrees to the perpendicular of the longitudinal axis of the first cutting roller. The respective faces can be arranged section-wise in the circumferential direction of the first cutting roller. The profile can be a profile that is not a conventional circumferential helix or thread profile which can run along the longitudinal axis around the first cutting roller.

A second cutting roller of the longitudinal cutting device can also have a high-low profile with a second set of longitudinal faces. The second set of longitudinal faces can be inclined to the direction of the longitudinal axis of the second cutting roller. The profile of the second cutting roller can also have a second set of abutting faces. The abutting faces can extend at least section-wise perpendicularly or be at least section-wise inclined up to four degrees to the perpendicular of the longitudinal axis of the second cutting roller. The respective faces can be arranged section-wise in the circumferential direction of the second cutting roller. The profile can be a profile that is not a conventional circumferential helix or thread profile which can run along the longitudinal axis around the second cutting roller.

The first cutting roller and the second cutting roller can be arranged in pairs.

The high-low profile of the first cutting roller can engage with the high-low profile of the second cutting roller to a penetration depth (T). The penetration depth (T) can be adjustable in the longitudinal/axial direction of the cutting rollers. A longitudinal face and a face of the high-low profile of the first cutting roller can abut section-wise on a face of the high-low profile of the second cutting roller, and a longitudinal face and a face of the high-low profile of the second cutting roller can abut on a face of the high-low profile of the first cutting roller. As such, the resultant cutting edges of the thus formed longitudinal cutting device can extend parallel in the longitudinal direction of the sheet material. At least three of four sides of the respective cut strips of the sheet material can be in contact between the respective longitudinal faces of the high-low profiles of the first cutting roller, the second cutting roller, and the respective abutting faces of the high-low profiles of the first cutting roller and the second cutting roller; being there in full contact with at least two or more sections/sides, as necessary depending on whether the material is formable or not formable. The cut strips can be guided at an angle to the respective longitudinal axes of the first cutting roller and the second cutting roller according to the inclinations of the respective longitudinal faces and parallel in the longitudinal direction of the sheet material according to the resultant cutting edges. Accordingly, the respective strips can be supplied parallel in the longitudinal direction of the sheet material continuously to the transverse cutting device.

In one or more embodiments, the respective shredded longitudinal strips of the sheet material can have a kink, which can result from the longitudinal faces of the respective cutting rollers being inclined towards one another in a mirror-inverted manner. As such, the respective material strip can result in good guiding.

In one or more embodiments, the high-low structure can be a mirror-symmetrical high-low structure with respective longitudinal faces correspondingly inclined in the other direction. The longitudinal faces of the first cutting roller and the longitudinal faces of the second cutting roller can each be inclined section-wise, for example, section-wise between two respective faces of the first cutting roller and the second cutting roller. In one or more embodiments, the longitudinal faces of the first cutting roller and the longitudinal faces of the second cutting roller can each be inclined section-wise with respect to the respective longitudinal axes of the first cutting roller and the second cutting roller with positive and negative inclination angles. Values of the respective inclination angles can be identical.

The profile of the first cutting roller, the profile of the second cutting roller, or both can be formed of a plurality of juxtaposed and mutually abutting pair wise abutting faces and longitudinal faces; i.e. the respective profiles can each extend section-wise around the circumference of the respective first cutting roller and second cutting roller.

The shredder can ensure that the sheet material and/or strips of the sheet material can be guided and shredded parallel to the in-feed/travel direction of the sheet material.

On account of the transverse guiding and on account of the corresponding inclination of the strips of the material in the region of the respective sections of the faces and longitudinal faces of the cutting rollers, there can be a reliable separation of the sheet material and strips of the sheet material from the cutting rollers of the longitudinal cutting device, even if the sheet material has not already cooled down to such an extent that it has solidified at least at the surface. Consequently, it is also possible, where necessary, to process tough-flowing material without resulting in clumping in the region of the longitudinal cutting device.

The inclination of the faces of the second cutting roller can extend along the radius of the second cutting roller outwardly away from the engaging faces of the first cutting roller, or the inclination of the faces of the first cutting roller can extend along the radius of the first cutting roller outwardly away from the engaging faces of the second cutting roller; i.e., away from the region forming the respective cutting edge. A region can be formed that corresponds to a certain distance between two adjacent corresponding sections of the profiles of the respective cutting rollers. Therefore, the shredded longitudinal strips can be spaced apart by the corresponding distance. As such, there can be an especially reliable in-feed to the transverse cutting device because contacting of the longitudinal strips can be prevented.

The inclination of the longitudinal faces can extend at an angle in the direction of the longitudinal axis of the first cutting roller and/or the inclination of the longitudinal faces extending at an angle in the direction of the longitudinal axis of the second cutting roller, such as up to thirty degrees. The respective angle can be selected depending on the material that is to be shredded.

The first cutting roller can be positioned above the second cutting roller. As such, the sheet material can be guided and shredded horizontally or substantially horizontally. The delivery of the sheet material, the shredding of the sheet material in the longitudinal direction and the shredding of the sheet material in the transverse direction can take place in succession in the horizontal direction, or the corresponding devices can be arranged in succession one after the other with substantially horizontal guiding of the sheet material. The corresponding arrangement of the devices can be arranged in the vertical direction with the first cutting roller and the second cutting roller juxtaposed, and with the guiding of the sheet material and the travel direction of said material being vertical or substantially vertical. Horizontal or vertical process guiding can be selected depending on the available space or depending on the respective sheet material that is to be processed.

The longitudinal axis of the first cutting roller can be parallel or inclined at an angle to the longitudinal axis of the second cutting roller. A parallel arrangement can have the advantage of good guiding of the sheet material. An inclined arrangement can have the advantage of improved and automatic re-sharpenability of the corresponding cutting edges, because the corresponding faces can slide off one another in a manner similar to scissors, thus providing an automatic re-sharpening effect.

The first cutting roller and the second cutting roller can be adjustable in their positions with respect to one another. For example, the positions of the longitudinal axes of the cutting rollers can be adjustable with respect to one another. For example, the penetration depth (T) of the profile of the first cutting roller with the profile of the second cutting roller can be adjustable. The penetration depth can be adjusted according to the thickness of the sheet material that is to be shredded.

A positioning device can be provided for adjusting the positions of the first cutting roller and the second cutting roller with respect to one another. The positioning device can apply, in resilient manner, a hydraulically, pneumatically, such as by air cylinders, or spring-power adjustable force to the sheet material, with the consequence that a cutting force of the longitudinal cutting device can be adjustable. Consequently, an appropriate adjustability of the force with which the two cutting rollers can be guided against each other can allow for the force with which the sheet material is shredded to be adjusted to suit the material that is to be shredded into strips.

In order to separate the transport/in-feed function of the device of this invention from the actual cutting function, an additional feeding device can be provided before the transverse cutting device for feeding the sheet material. The feeding device can be positioned before or after the longitudinal cutting device. With the feeding device positioned before the longitudinal cutting device, the sheet material that has not yet been shredded into strips can be fed by the corresponding feeding device, allowing for improvement of the delivery from the upstream extrusion device/autoclave opening. Furthermore, the transverse cutting device can be positioned immediately after the longitudinal cutting device, allowing for a compact design of the overall machine or apparatus. With the feeding device positioned after the longitudinal cutting device, the strips of the sheet material can be reliably transported away from the longitudinal cutting device and can be supplied to the transverse cutting device.

In one or more embodiments, the longitudinal cutting device can be in the form of a feeding device, dispensing with a need for a separate feeding device and allowing the machine or apparatus to have a compact design. As a result of the guiding of the strips of the sheet material in the region of the longitudinal cutting device, the longitudinal cutting device can be correspondingly used to feed the sheet material and remove the sheet material.

The device can be used for shredding sheet material. The material can be a plastic material, a cellulose material, a pulp material, a paper material, an elastomer material, a metal material, or combinations thereof. The material can be formable or not formable. Consequently, the device can have a broad range of application and is not limited to sheet materials such as paper materials. Rather, the improved guiding of the sheet material/shredded strands of the sheet material can permit a continuously reliable operation of the shredder.

Figure 1:
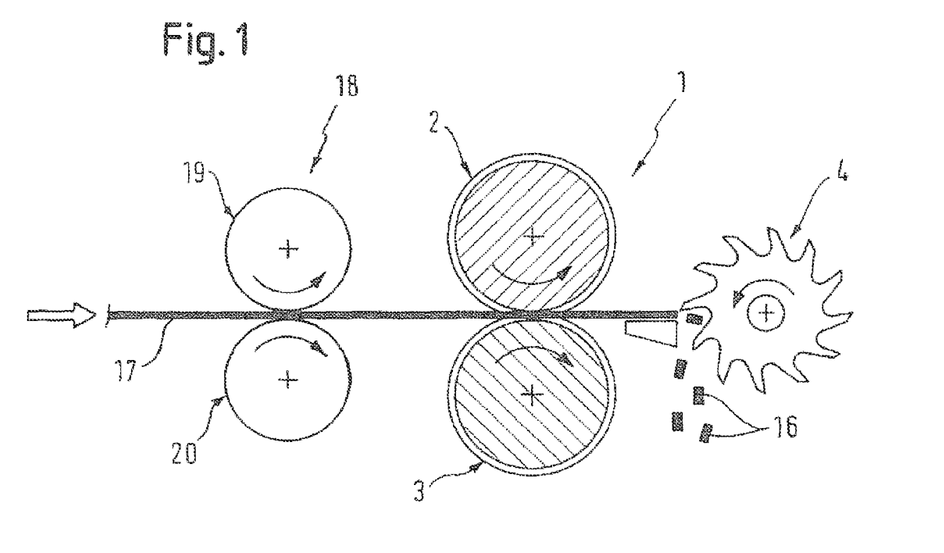
FIG. 1 depicts a schematic side elevation view of a shredder according to one or more embodiments.

FIG. 1 depicts a schematic side elevation view of a shredder for producing particles 16 from a sheet material 17 according to one or more embodiments. A longitudinal cutting device 1 with a first cutting roller 2 and a second cutting roller 3 is depicted. The first cutting roller 2 and the second cutting roller 3 can be arranged one above the other. A transverse cutting device 4 can be disposed after the longitudinal cutting device 1. The movement/in-feed direction of the sheet material 17, which is in the longitudinal direction of the sheet material 17, is by the arrow on the left in the drawing. In an embodiment, the sheet material 17 can be fed in by means of an additional feeding device 18 having a first counter-rotating feed roller 19 and a second counter-rotating feed roller 20. The additional feeding device 18 can be positioned before the longitudinal cutting device 1 in the travel direction of the sheet material 17. In one or more embodiments, the additional feeding device 18 can be positioned after the longitudinal cutting device 1 as viewed in the travel direction of the sheet material 17. In one or more embodiments, the longitudinal cutting device 1 can be a feeding device.

The longitudinal cutting device 1 can shred the supplied sheet material 17 into individual strands, which can be supplied after the longitudinal cutting device 1 directly to the transverse cutting device 4. The transverse cutting device 4 can shred the individual strands into particles 16.

The two cutting rollers, i.e. the first cutting roller 2 and the second cutting roller 3, of the longitudinal cutting device 1 can rotate in opposite directions of rotation.

Figure 2:
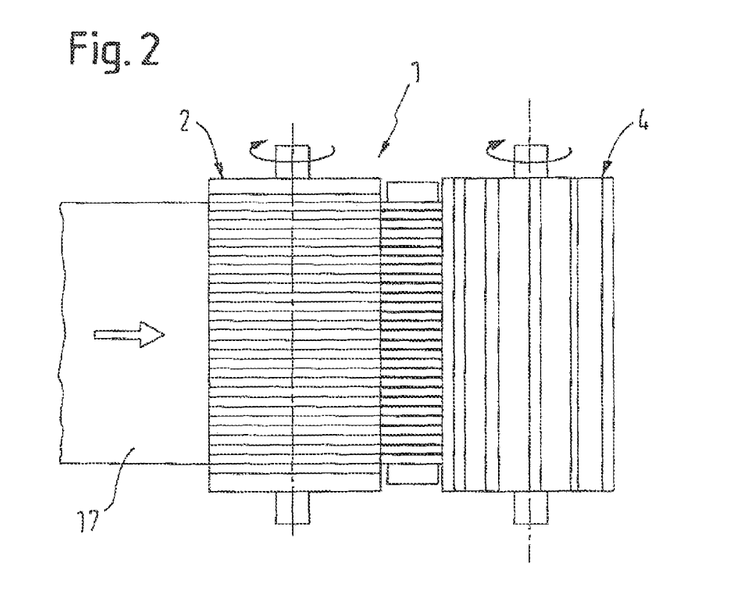
FIG. 2 depicts a schematic top plan view of the shredder.

FIG. 2 depicts a top plan view of the shredder. Upon leaving the longitudinal cutting device 1, the sheet material 17, which has been supplied to the longitudinal cutting device 1, is shredded into strips. The strips can continue to be guided parallel to the travel direction of the sheet material 17 and can be shred into particles in the transverse cutting device 4, which can be positioned after the longitudinal cutting device 1. Also shown is the first cutting roller 2.

Figure 3:
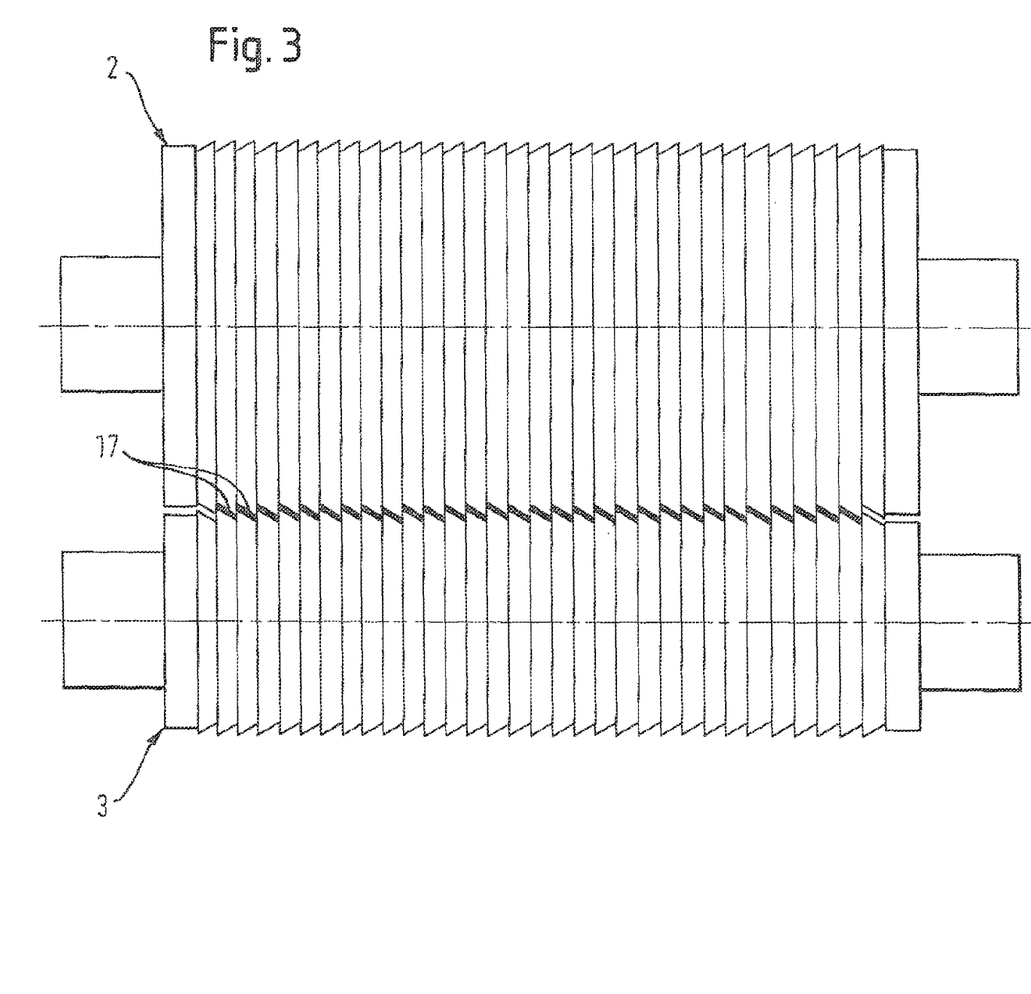
FIG. 3 depicts a partially cut-away schematic view of a first cutting roller and a second cutting roller of a longitudinal cutting device of a shredder according to one or more embodiments.

FIG. 3 depicts a schematic view of an arrangement of the first cutting roller 2 and the second cutting roller 3 of the longitudinal cutting device. The sheet material 17 can be shredded into corresponding longitudinal strips between the two cutting rollers 2 and 3. The sheet material 17 can be guided between the first cutting roller 2 and the second cutting roller 3. The respective cutting rollers 2 and 3 can be provided section-wise along their longitudinal axis with a saw-tooth profile. The respective sections of the saw-tooth profile of the first cutting roller 2 can engage with respective sections of the saw-tooth profile of the second cutting roller 3. The profile of the first cutting roller 2 and the profile of the second cutting roller 3 can each be formed of a plurality of juxtaposed and mutually abutting pairwise faces and longitudinal faces.

Figure 4A:
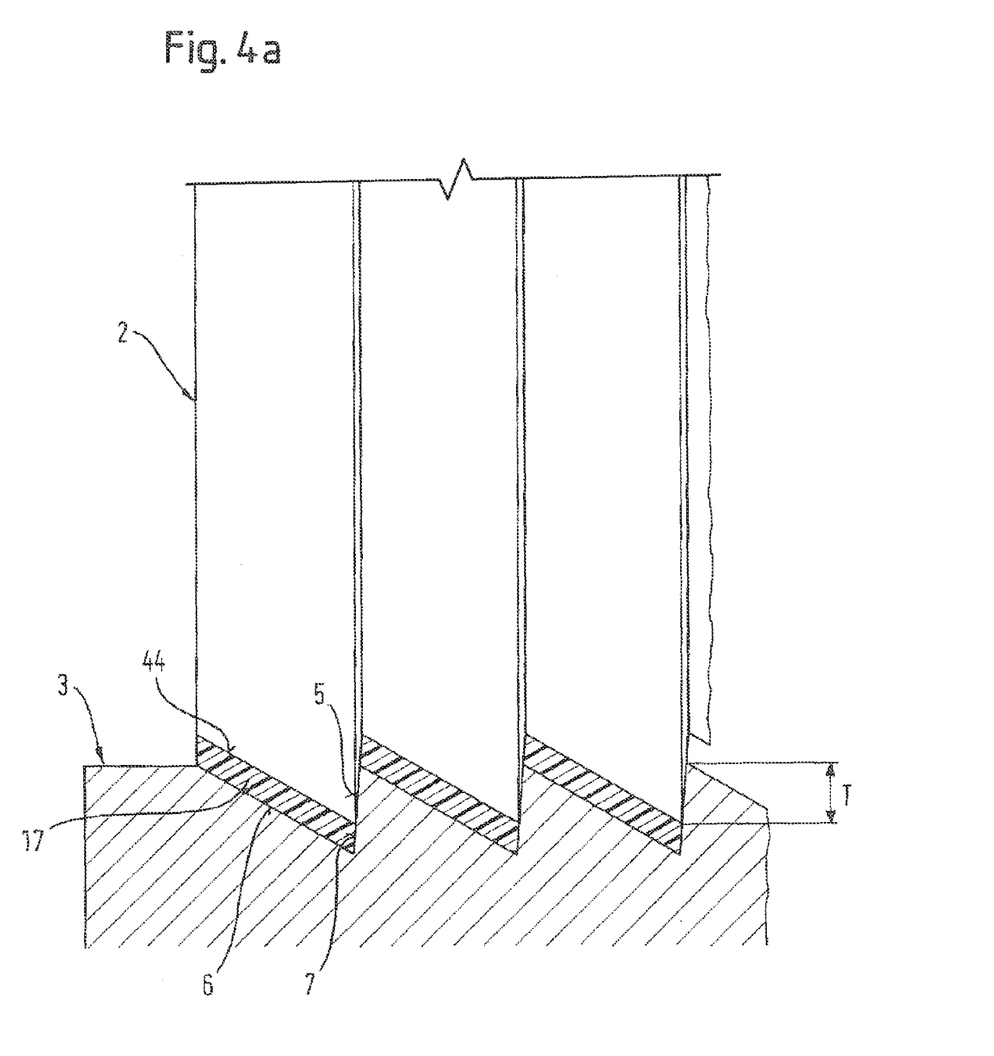
FIG. 4a depicts an enlarged schematic detail of a region of two cutting rollers of a shredder processing a formable material according to one or more embodiments.
Figure 4B:
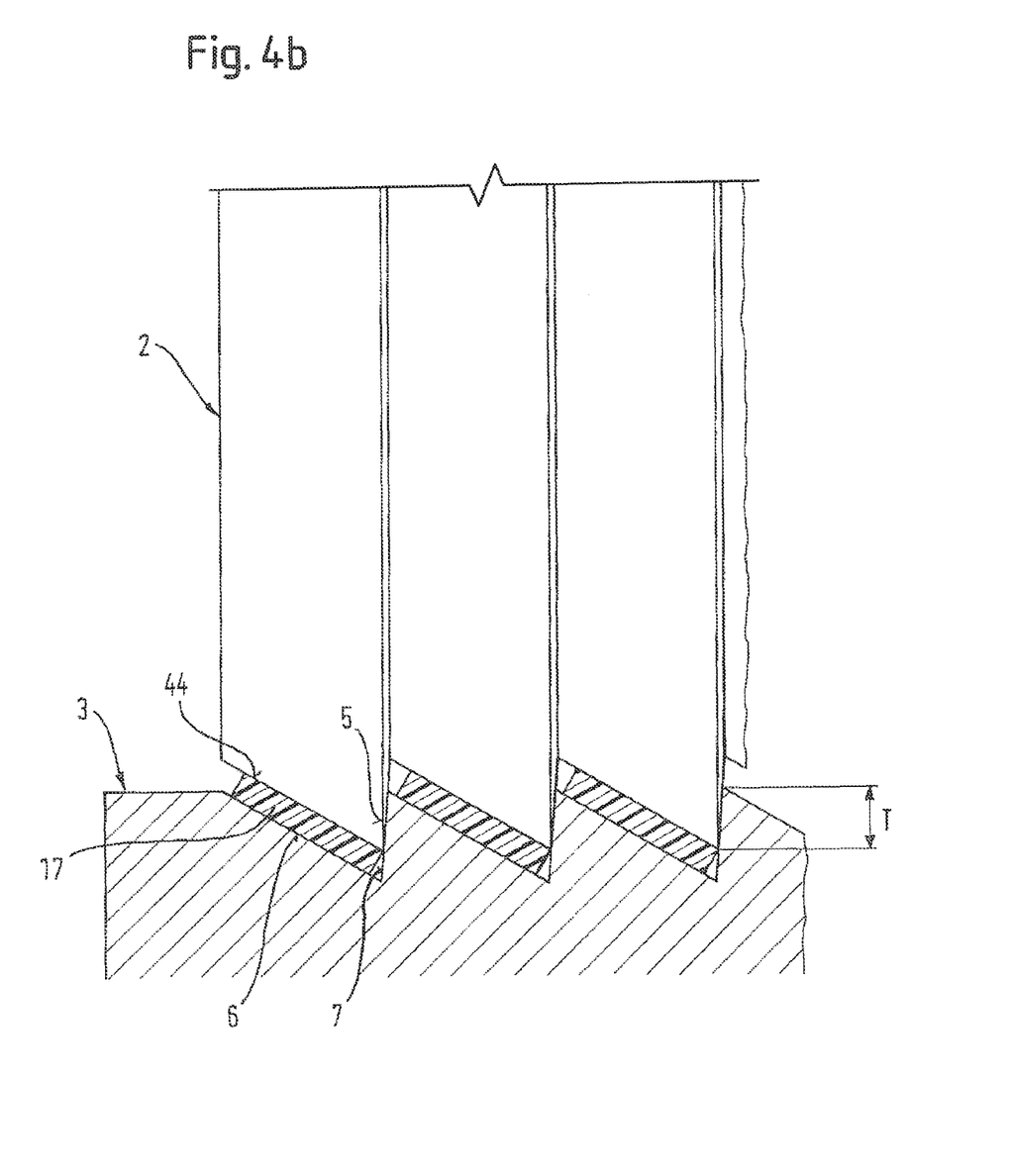
FIG. 4b depicts an enlarged schematic detail of a region of two cutting rollers of a shredder processing material that is not formable according to one or more embodiments.

FIGS. 4a and 4b each depict an enlarged schematic detail of the two cutting rollers 3 and 2.

The first cutting roller 2 can have a saw-tooth profile with first longitudinal faces 44. The first longitudinal faces 44 can be inclined to the direction of the longitudinal axis of the first cutting roller 2. First abutting faces 5 can extend at least section-wise perpendicularly to the longitudinal axis of the first cutting roller 2. The first abutting faces 5 can be arranged perpendicularly to the longitudinal axis of the first cutting roller 2.

The second cutting roller 3 can have a saw-tooth profile with second longitudinal faces 6. The second longitudinal faces 6 can be inclined to the direction of the longitudinal axis of the second cutting roller 3. Second abutting faces 7 can extend at least section-wise perpendicularly or can be at least section-wise inclined up to four degrees to the perpendicular of the longitudinal axis of the second cutting roller 3. The inclination of the second abutting faces 7 can ensure that the individual regions of the saw-tooth profile are somewhat spaced apart in the longitudinal direction of the respective cutting axes.

The saw-tooth profile of the first cutting roller 2 can engage with the saw-tooth profile of the second cutting roller 3 to a penetration depth (T) that, in the longitudinal/axial direction of the cutting rollers 2 and 3, a first longitudinal face 4 and a first abutting face 5 of the saw-tooth profile of the first cutting roller 2 can abut section-wise on a second abutting face 7 of the saw-tooth profile of the second cutting roller 3. Consequently, the resultant cutting edges of the thus formed longitudinal cutting device can extend parallel in the longitudinal direction of the sheet material 17, orthogonally to the plane of the representation in FIG. 7, and in and out from the two-dimensional plane of the representations in FIG. 4a and FIG. 4b. At least three of four sides of the respective cut strips of the sheet material 17 can be in contact between the respective longitudinal faces 44 and 6 of the saw-tooth profiles of the first cutting roller 2 and the second cutting roller 3, and between the respective abutting faces 7 of the saw-tooth profile of the second cutting roller 3, or can be fully in contact therebetween. The cut strips can be guided at an angle to the respective longitudinal axes of the first cutting roller 2 and the second cutting roller 3 according to the inclinations of the respective longitudinal faces 44 and 6. The cut strips can be guided in the longitudinal direction of the sheet material 17; i.e., in the plane perpendicular to the plane of the representations in FIG. 4a and FIG. 4b, and parallel in the longitudinal direction of the sheet material 17 according to the resultant cutting edges. As such, after the longitudinal cutting device, the respective strips can be supplied parallel in the longitudinal direction of the sheet material 17 continuously to the transverse cutting device.

The representation in FIG. 4b differs from the representation in FIG. 4a in that, in FIG. 4b, the sheet material 17 shown being processed is not formable, whereas, in FIG. 4a, the sheet material 17 shown being processed is formable and thus fills the there-created space between the respective faces, filling said space or being in full contact with the corresponding faces.

Figure 5A:
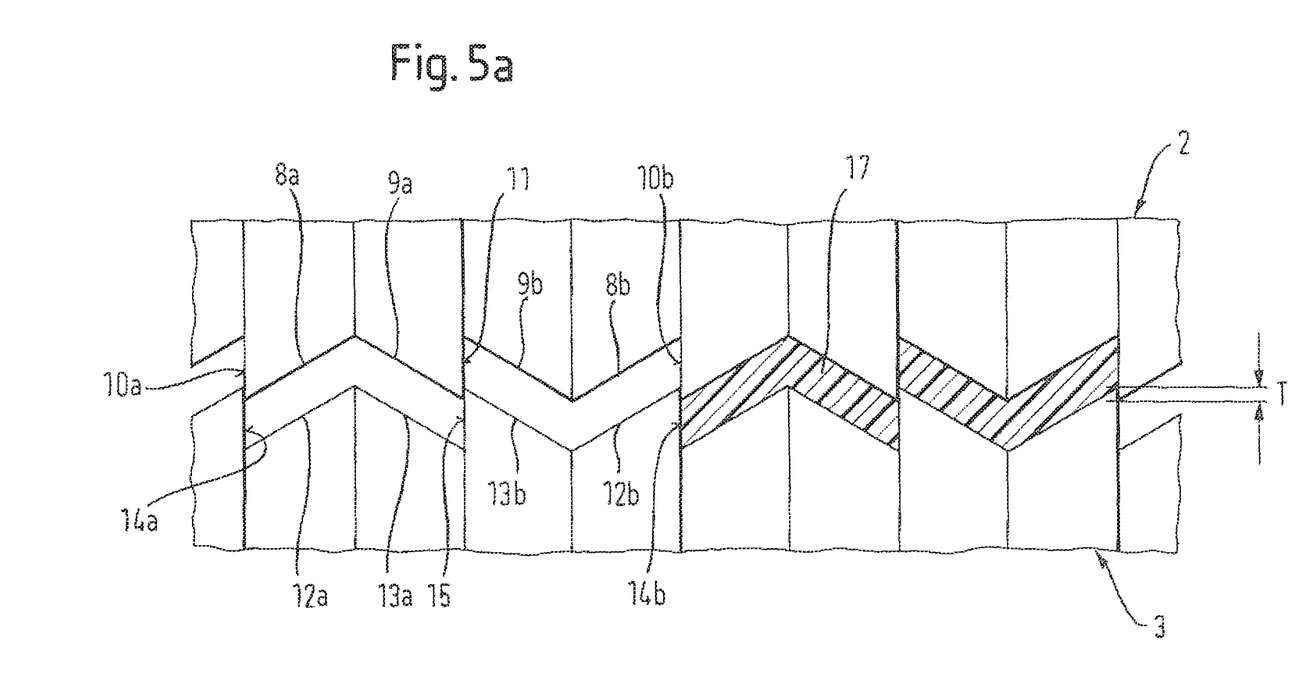
FIG. 5a depicts an enlarged schematic detail of two cutting rollers of a longitudinal cutting device of the shredder processing material that is formable according to one or more embodiments.
Figure 5B:
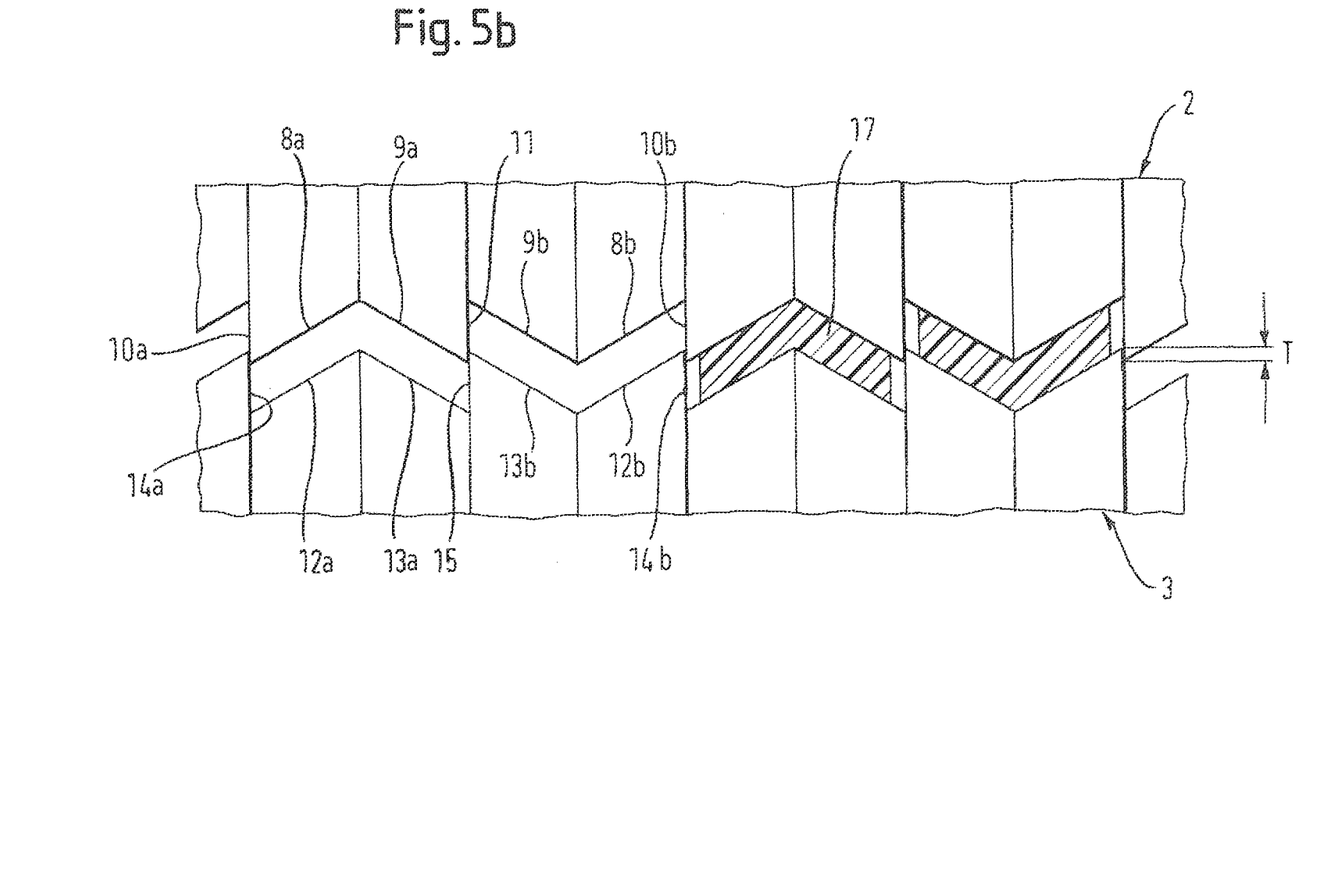
FIG. 5b depicts an enlarged schematic detail of two cutting rollers of a longitudinal cutting device of the shredder processing material that is not formable according to one or more embodiments.

FIG. 5a and FIG. 5b each show a schematic sectional view of an embodiment of the profiles of the first cutting roller 2 and the second cutting roller 3 of the longitudinal cutting device of a shredder. The first cutting roller 2 can have a high-low profile with first longitudinal faces 8a, 8b, 9a, and 9b. The first longitudinal faces 8a, 8b, 9a, and 9b can be inclined to the direction of the longitudinal axis of the first cutting roller 2. First abutting faces 10a and 10b and 11 can extend at least section-wise perpendicularly or can be at least section-wise inclined up to four degrees to the perpendicular of the longitudinal axis of the first cutting roller 2. FIG. 5a and FIG. 5b each show the vertical extent of the first abutting faces 10a and 10b and 11. The second cutting roller 3 can have a high-low profile with second longitudinal faces 12a and 12b and 13a and 13b. The second longitudinal faces 12a and 12b and 13a and 13b can be inclined to the direction of the longitudinal axis of the second cutting roller 3. Second abutting faces 14a, 14b and 15 can extend at least section-wise perpendicularly or can be at least section-wise inclined up to four degrees to the perpendicular of the longitudinal axis of the second cutting roller 3. FIG. 5a and FIG. 5b each show the second abutting faces 14a, 14b, and 15 as vertically extending faces.

The respective high-low profile of the first cutting roller 2 can engage with the high-low profile of the second cutting roller 3 to a penetration depth (T). The longitudinal/axial direction of the cutting rollers 2 and 3, the at least one of the first longitudinal faces 8a and 8b, and at least one of the first abutting faces 10a and 10b of the high-low profile of the first cutting roller 2 can abut section-wise on at least one of the second abutting faces 14a and 14b of the high-low profile of the second cutting roller 3. At least one of the first longitudinal faces 9a and 9b and at least one of the first abutting faces 11 of the high-low profile of the first cutting roller 2 can abut on at least one of the second abutting faces 15 of the high-low profile of the second cutting roller 3. At least one of the second longitudinal faces 13a and 13b and at least one of the second abutting faces 15 of the high-low profile of the second cutting roller 3 can abut at least one of the first abutting face 11 of the high-low profile of the first cutting roller 2. At least one of the second longitudinal faces 12a and 12b and at least one of the second abutting faces 14*a* and 14*b* of the high-low profile of the second cutting roller 3 can abut on at least one of the first abutting faces 10*a* and 10*b* of the high-low profile of the first cutting roller 2. Consequently, cutting edges can be formed between at least one of the first abutting faces 10*a* and 10*b* and at least one of the first longitudinal faces 8*a* and 8*b* of the first cutting roller 2 and at least one of the second abutting faces 14*a* and 14*b* of the second cutting roller 3 and can mirror-symmetrically thereto between at least one of the first abutting faces 11 and at least one of the first longitudinal faces 9*a* and 9*b* of the first cutting roller 2 and at least one of the second abutting faces 15 of the second cutting roller 3, and between at least one of the second abutting faces 15 and at least one of the second longitudinal faces 12*a* and 12*b* of the second cutting roller 3 and at least one of the first abutting faces 11 of the first cutting roller 2, and so forth. The respective strips of the sheet material 17 can each extend at an angle to the respective longitudinal axes of the first cutting roller 2 and second cutting roller 3 with a kink according to the inclinations of the respective longitudinal faces. The strips can be guided parallel in the longitudinal direction of the sheet material 17 according to the resultant cutting edges, with the consequence that after the longitudinal cutting device, the respective strips can be supplied parallel in the longitudinal direction of the sheet material continuously to the transverse cutting device.

Also, the representation in FIG. 5*b* differs from the representation in FIG. 5*a* in that, in FIG. 5*b*, the sheet material 17 being processed is not formable, whereas, in FIG. 5*a*, the sheet material 17 being processed is formable and thus can fill the there-created space between the respective faces, with the space being fully filled or with the sheet material being in full contact with the corresponding faces.

Where necessary, the shredded material can spring back from the kinked state shown in FIG. 5*a* and FIG. 5*b* into a flat state.

The shapes of the respective strips of the sheet material and the geometrical configuration of the device as depicted in FIG. 4*a*, FIG. 4*b*, FIG. 5*a*, and FIG. 5*b* can be varied depending on the properties of the respective material and the degree of formability of the material.

The relatively simple design of the device can permit the secure parallel guiding of the sheet material and of the cut longitudinal strips of the sheet material in the longitudinal direction and/or travel direction of the sheet material through the entire device. The cut strips of the sheet material can be simply and reliably separated from the cutting rollers of the longitudinal cutting device, while at the same time the device can maintain a reliable parallel in-feed to the transverse cutting device.

Figure 6:
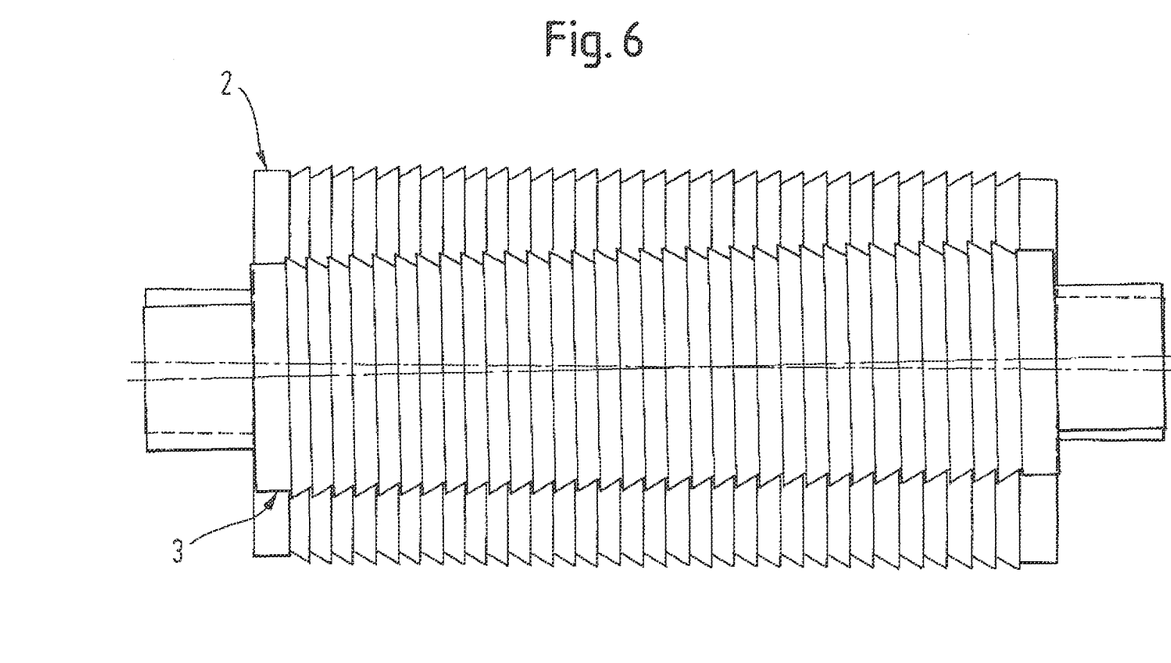
FIG. 6 depicts a schematic top plan view of a first cutting roller and a second cutting roller of a longitudinal cutting device of a shredder according one or more embodiments.

FIG. 6 depicts the first cutting roller 2 and the second cutting roller 3 of the longitudinal cutting device according to one or more embodiments. The longitudinal axis of the first cutting roller 2 can be arranged such that it is not parallel to the longitudinal axis of the second cutting roller 3, but is inclined thereto. As such, an improved re-sharpenability of the corresponding cutting edges can result, as the corresponding faces can thus slide off one another in a manner similar to that of scissors, thereby providing an automatic re-sharpening effect.

In one or more embodiments, the cutting rollers can have identical diameters or different diameters. In one or more embodiments, the circumferential speeds of the cutting rollers can be identical.

While these embodiments have been described with emphasis on the embodiments, it should be understood that within the scope of the appended claims, the embodiments might be practiced other than as specifically described herein.

What is claimed is:

1. A shredder for producing particles from a sheet material, wherein the shredder comprises: a transverse cutting device positioned after a longitudinal cutting device, wherein the longitudinal cutting device comprises:

a. a first cutting roller comprising a first saw-tooth profile with first longitudinal faces, wherein the first longitudinal faces are inclined to a direction of a longitudinal axis of the first cutting roller, wherein first abutting faces are located on the first cutting roller, and wherein the first abutting faces extend at least section-wise perpendicularly to the longitudinal axis of the first cutting roller;

b. a second cutting roller comprising a second saw-tooth profile with second longitudinal faces, wherein the second longitudinal faces are inclined to a direction of a longitudinal axis of the second cutting roller, wherein second abutting faces are located on the second cutting roller, and wherein the second abutting faces extend at least section-wise perpendicularly to the longitudinal axis of the second cutting roller or at least section-wise inclined up to four degrees to a perpendicular of the longitudinal axis of the second cutting roll; and c. wherein the first saw-tooth profile and the second saw-tooth profile engage to a penetration depth such that in the direction of the longitudinal axes of the cutting rollers at least one of the first longitudinal faces and at least one of the first abutting faces abuts section-wise on at least one of the second abutting faces, wherein cutting edges extend parallel in the longitudinal direction of a sheet material, wherein at least three of four sides of cut strips of the sheet material are in contact between respective longitudinal faces of the saw-tooth profiles of the first cutting roller and second cutting roller and the second abutting faces of the saw-tooth profile of the second cutting roller and are guided at an angle to respective longitudinal axes of the first cutting roller and the second cutting roller according to inclinations of the respective longitudinal faces and are guided parallel in the longitudinal direction of the sheet material according to resultant cutting edges, and wherein the respective cut strips are supplied parallel in the longitudinal direction of the sheet material continuously to the transverse cutting device.

2. The device of claim 1, wherein the profile of the first cutting roller, the second cutting roller, or both are formed of a plurality of juxtaposed and mutually abutting pairwise faces and longitudinal faces.

3. The device of claim 1, wherein inclination of the second abutting faces of the second cutting roller extends along a radius of the second cutting roller outwardly away from engaging first abutting faces of the first cutting roller.

4. The device of claim 1, wherein inclination of the longitudinal faces extending at an angle in the direction of the longitudinal axis of the first cutting roller is up to thirty degrees, wherein inclination of the longitudinal faces extending at an angle in the direction of the longitudinal axis of the second cutting roller is up to thirty degrees, or combinations thereof.

5. The device of claim 1, wherein the first cutting roller is positioned above the second cutting roller.

6. The device of claim 1, wherein the longitudinal axis of the first cutting roller is parallel or inclined at an angle to the longitudinal axis of the second cutting roller.

7. The device of claim 1, wherein the first cutting roller and the second cutting roller are adjustable with respect to one another.

8. The device of claim 7, wherein a position of the longitudinal axis of the first cutting roller is adjustable with respect to the longitudinal axis of the second cutter, the penetration depth of the profile of the first cutting roller with the profile of the second cutting roller is adjustable, or combinations thereof.

9. The device of claim 8, wherein the penetration depth is adjusted according to a thickness of the sheet material to be shredded.

\* \* \* \* \*